US006533306B2

(12) United States Patent
Watkins

(10) Patent No.: US 6,533,306 B2
(45) Date of Patent: Mar. 18, 2003

(54) ADJUSTABLE HEIGHT ANTI-TIP WHEELS FOR A POWER WHEELCHAIR

(75) Inventor: Walter A. Watkins, Courtdale, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 7 days.

(21) Appl. No.: 09/765,022

(22) Filed: Jan. 18, 2001

(65) Prior Publication Data

US 2002/0093172 A1 Jul. 18, 2002

(51) Int. Cl.[7] ................................................ B62M 1/00
(52) U.S. Cl. .................... 280/304.1; 280/298; 280/301; 280/87.041
(58) Field of Search ........................... 280/250.1, 304.1, 280/293, 298, 301, 87.01, 87.021, 87.041

(56) References Cited

U.S. PATENT DOCUMENTS

| | | | | |
|---|---|---|---|---|
| 3,848,883 | A | 11/1974 | Breacain | 280/5.32 |
| 4,515,385 | A | 5/1985 | Christian | 280/289 WC |
| 4,542,918 | A | 9/1985 | Singleton | 280/650 |
| 4,730,842 | A | 3/1988 | Summers et al. | 280/638 |
| 5,113,959 | A | 5/1992 | Mastov et al. | 180/11 |
| 5,137,295 | A | 8/1992 | Peek | 280/304.1 |
| 5,181,733 | A | 1/1993 | Tague | 280/304 |
| 5,209,509 | A | 5/1993 | Gay et al. | 280/304.1 |
| 5,294,141 | A | 3/1994 | Mentessi et al. | 280/250.1 |
| 5,351,774 | A | 10/1994 | Okamoto | 180/65.1 |
| 5,531,284 | A | 7/1996 | Okamoto | 180/65.1 |
| 5,540,297 | A | 7/1996 | Meier | 180/65.5 |
| 5,575,348 | A | 11/1996 | Goertzen et al. | 180/65.6 |
| 5,697,465 | A | 12/1997 | Kruse | 180/65.1 |
| 5,772,237 | A | 6/1998 | Finch et al. | 280/704 |
| 5,848,658 | A | 12/1998 | Pulver | 180/65.1 |
| 5,853,059 | A | 12/1998 | Goertzen et al. | 180/65.6 |
| 5,855,387 | A | 1/1999 | Gill et al. | 280/283 |
| 5,904,214 | A | 5/1999 | Lin | 180/15 |
| 5,944,131 | A | 8/1999 | Schaffner et al. | 180/65.1 |
| 6,129,165 | A | 10/2000 | Schaffner et al. | 180/65.1 |
| 6,234,507 | B1 | 5/2001 | Dickie et al. | 280/304.1 |
| 6,341,657 | B1 | 1/2002 | Hopely, Jr. et al. | 180/6.5 |
| 6,357,793 | B1 * | 3/2002 | Dickie et al. | 280/250.1 |

FOREIGN PATENT DOCUMENTS

| | | |
|---|---|---|
| FR | 2.215.054 | 8/1974 |
| FR | 2.399.822 | 9/1979 |
| GB | 2 192 595 | 1/1988 |
| WO | WO87/06205 | 10/1987 |
| WO | WO96/15752 | 5/1996 |

OTHER PUBLICATIONS 4 page brochure entitled "Permobile Power For Kids", publication date unknown.

2 page brochure entitled "Puma Booster", publication date unknown.

6 page brochure entitled "Cruiser 4E Action Power", publication date unknown.

* cited by examiner

*Primary Examiner*—Lesley D. Morris
*Assistant Examiner*—Matthew Luby
(74) *Attorney, Agent, or Firm*—Drinker Biddle & Reath LLP

(57) ABSTRACT

The present invention is an improved anti-tip wheel assembly for a wheelchair. The preferred embodiment of the assembly includes a cam mechanism to allow the initial height of an anti-tip wheel above ground to be adjusted dependent on the obstructions which the wheelchair is expected to encounter. The cam mechanism fixes the position of the anti-tip wheels to prevent the wheels from unintentionally displacing when an anti-tip wheel contacts the ground or an obstruction.

32 Claims, 3 Drawing Sheets

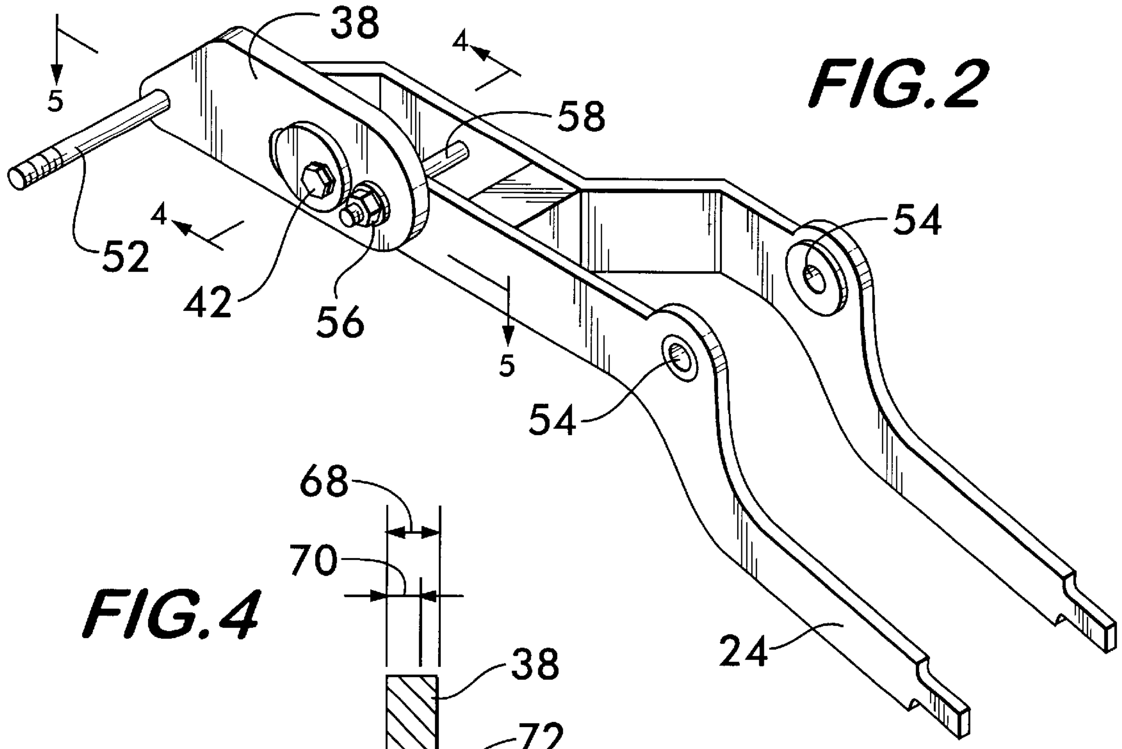
FIG.2
FIG.4
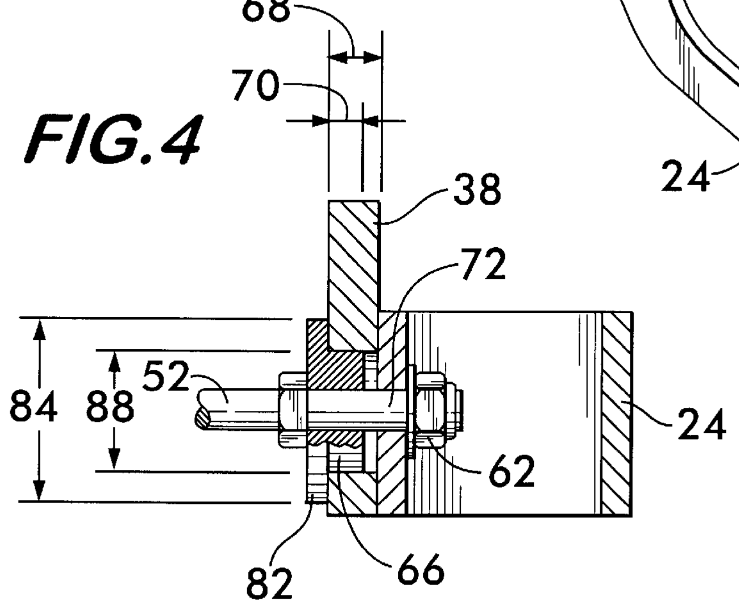
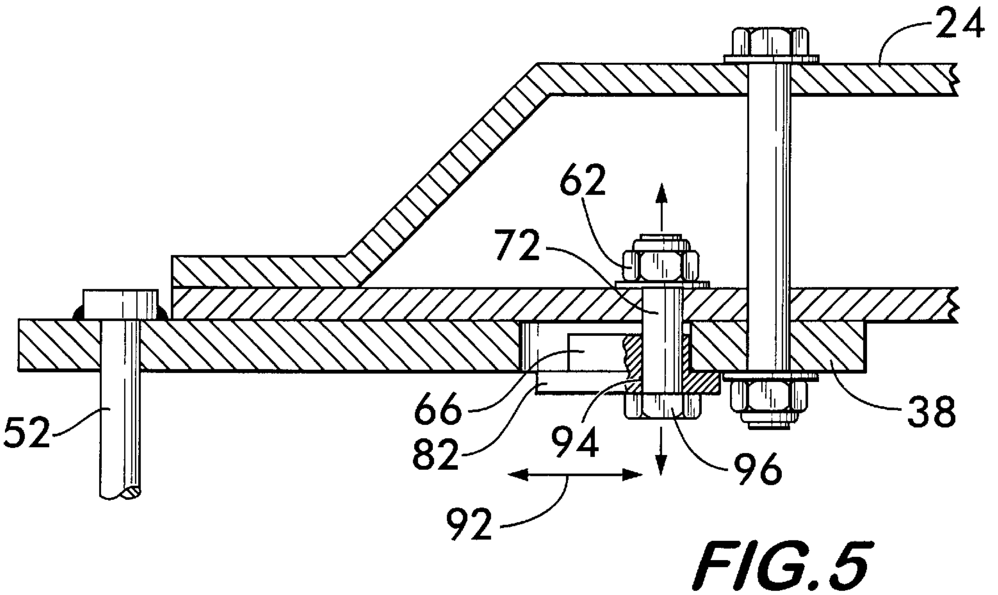
FIG.5

ADJUSTABLE HEIGHT ANTI-TIP WHEELS FOR A POWER WHEELCHAIR

FIELD OF THE INVENTION

The present invention relates to an assembly for supporting anti-tip wheels on a wheelchair. More particularly, the assembly incorporates a locking mechanism which allows adjustment of the relative height of anti-tip wheels above the ground.

BACKGROUND OF THE INVENTION

Some members of society have difficulty walking due to health problems. To provide mobility to these people, wheelchairs and power wheelchairs have been developed. These wheelchairs rotate forwards or backwards as torque is applied to the wheels of the wheelchair, or as the chair is accelerated or decelerated. To counter the forward or backward rotation of the wheelchair, anti-tip wheels have been combined with wheelchairs to limit the distance that the wheelchair can rotate forwards or backwards.

The height of front- or rear-mounted anti-tip wheels mounted on a wheelchair may limit the height of an obstruction which can be traversed, by causing the main wheels to be lifted off of the ground during traversal of the obstacle.

However, the greater the height of the anti-tip wheels, the greater the amount the wheelchair may rotate forwards or backwards before the anti-tip wheels engage the ground. Adjusting the anti-tip wheels to be closer to the ground alleviates this problem; however, it also limits the size of obstructions which can be overcome. The height at which the anti-tip wheels are mounted on the wheelchair, therefore, is a balance between the size of obstacles expected to be encountered and the degree of tipping one is willing to tolerate.

SUMMARY OF THE INVENTION

The present invention is an anti-tip strut assembly which allows adjustment of the height of an anti-tip wheel above the ground. A preferred embodiment of the assembly incorporates a cam mechanism to allow the initial positioning of the anti-tip wheels to be adjusted relative to the ground over which the wheelchair is expected to travel. The assembly includes an adjuster plate mounted to the strut. The adjuster plate has a pivoting connection to the strut at one end of the adjuster plate, an anti-tip wheel pin at the opposite end, and a slot between the two positions. A cam is mounted to the strut, and extends through the slot in the adjuster plate. Changes in the angle between the adjuster plate and the strut force rotation of the adjustment cam. A mechanical fastener allows the cam to be locked against the adjuster plate or the strut, preventing the cam from inadvertently rotating when an obstruction is encountered.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 2 is a perspective view of a strut embodying the present invention.

FIG. 4 is a cross-sectional view of a cam adjustment mechanism.

FIG. 5 is a cross-sectional view of a cam adjustment mechanism.

DETAILED DESCRIPTION OF THE DRAWINGS

The preferred embodiment of the present invention is an anti-tip assembly for a powered, mid-wheel driven wheelchair. Such a wheelchair is shown in U.S. Pat. No. 5,944,131, incorporated herein by reference. More particularly, the preferred embodiment is for an anti-tip strut for use in conjunction with an active suspension for a mid-wheel driven power chair, as shown in U.S. Pat. No. 6,129,165 and commonly owned U.S. patent application Ser. No. 09/166,303, herein incorporated by reference.

The active suspension for a mid-wheel driven power chair described in the above referenced patent applications uses two motors to drive the mid-wheels. The mid-wheels are connected to the motors, which are mounted to the anti-tip struts. The anti-tip struts are rotatably connected to the frame of the wheelchair. At least one spring element is connected between the strut and the frame to limit the rotation of the strut. The torque applied to the mid-wheels in order to accelerate the wheelchair is countered by the elastic elements supporting the struts. The force on the elastic elements causes the anti-tip wheels to raise further above the ground. Deceleration causes a reverse reaction, rotating the anti-tip wheels towards the ground. This system improves the balance between the capability to overcome obstacles and the allowable forward pitching motion, but is limited by the need to provide elastic elements stiff enough to provide an acceptable ride quality.

Figure 1:
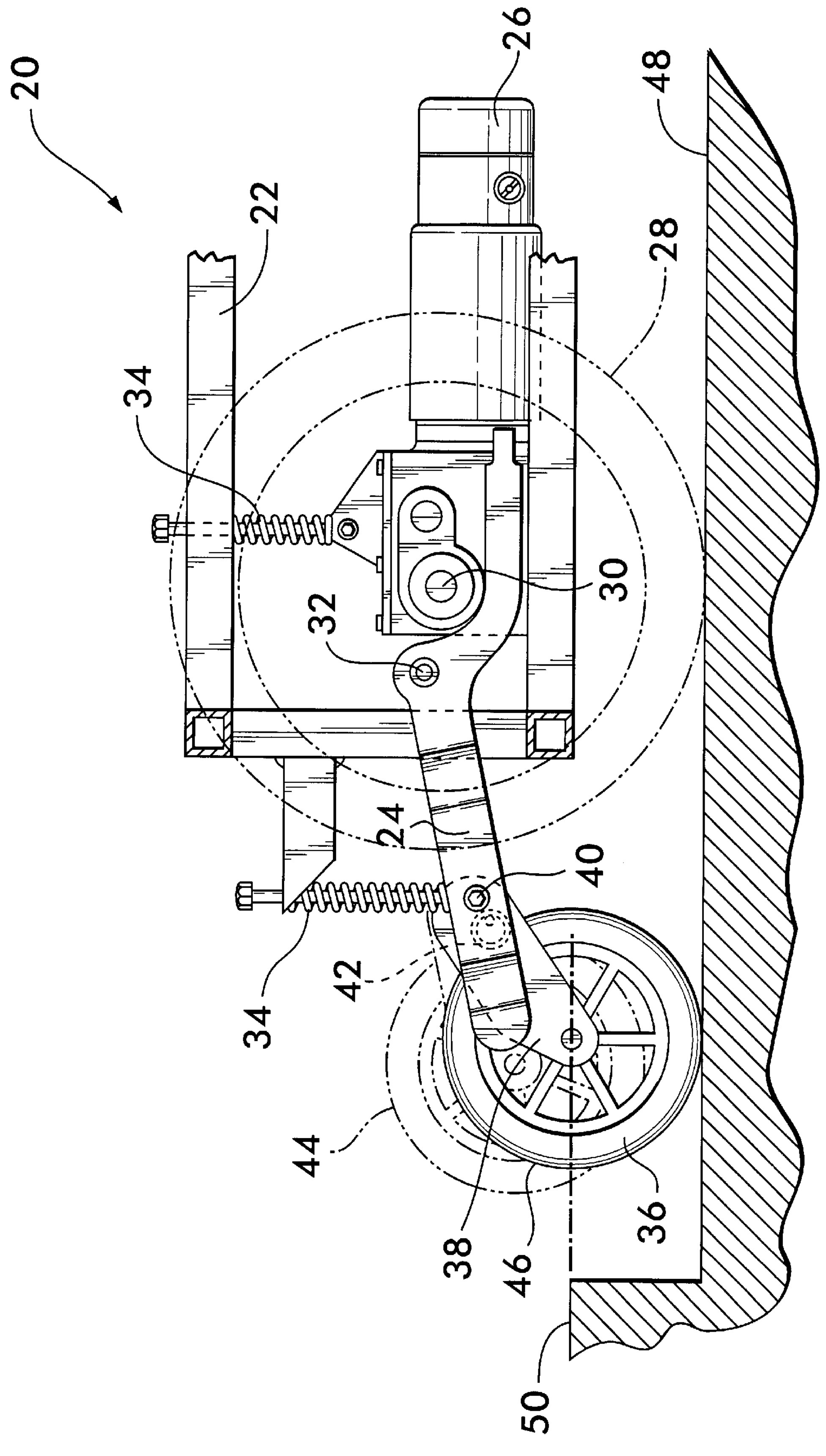
FIG. 1 is a partial view of a powertrain and frame of a power wheelchair having a connected front anti-tip wheel.

The preferred embodiment of the present invention is shown adapted for use with the active suspension power chair described. Referring now to the drawings, wherein like reference numerals illustrate corresponding or similar elements throughout the several views, FIG. 1 shows a portion of the structure of a power wheelchair. The wheelchair structure which is generally designated by the numeral 20 includes a frame 22 which provides mounting points for a strut 24. A motor 26 is attached to the strut 24. A driven mid-wheel 28 rotates about an axle 30 which is driven by the motor 26. The strut 24 is pivotable about a strut pin 32 which connects the strut 24 to the frame 22. Spring 34 limits the rotation of the strut 24 about the strut pin 32, as well as provides a resilient suspension for the front anti-tip wheel 36. Wheel 36 is mounted to an adjuster plate 38, which is in turn pivotably connected 40 to the strut 24. A locking means 42 fixes the angular position of the adjuster plate 38 relative to the strut 24.

Also shown in FIG. 1 are anti-tip wheels 36 superimposed to show higher 44 and lower 46 positions available within the range adjustment of the adjuster plate 38. With the anti-tip wheels 36 in the lower position 46, the ability of the power wheelchair to rotate forward is limited by the proximity of the anti-tip wheels 36 to the ground. When the anti-tip wheels 36 are adjusted to a higher position 44, larger obstructions can be cleared. This adjustability allows the occupant of a wheelchair to vary the compromise inherent in positioning anti-tip wheels 36, optimizing the position of the anti-tip wheels 36 based on the obstructions 50 expected to be encountered.

As shown in FIG. 2, the locking means 42 is located between the adjuster plate 38 and the strut 24. A wheel stud 52 extends from the adjuster plate 38 providing a mounting point for an anti-tip wheel 36. The strut 24 has a pair of co-axial apertures 54 which allow the strut 24 to be rotatably mounted to the frame 22 (shown in FIG. 1).

The adjuster plate 38 is connected to the strut 24 at the adjuster plate pivot 56. The adjuster plate pivot 56 rotatably connects the adjuster plate 38 and the strut 24. The adjuster plate pivot 56 consists of a bolt 58 passed through the adjuster plate 38 and the strut 24. The end of the bolt 58 is threaded, and a nut 62 retains the bolt 58 to the assembly. When the nut 62 is tightened, it pulls the adjuster plate 38 into contact with the strut 24. This contact creates friction between the adjuster plate 38 and the strut 24, and thus prevents rotation of the adjuster plate 38 relative to the strut 24. When the nut 62 is loosened, the adjuster plate 38 can rotate about this connection relative to the strut 24.

Figure 3:
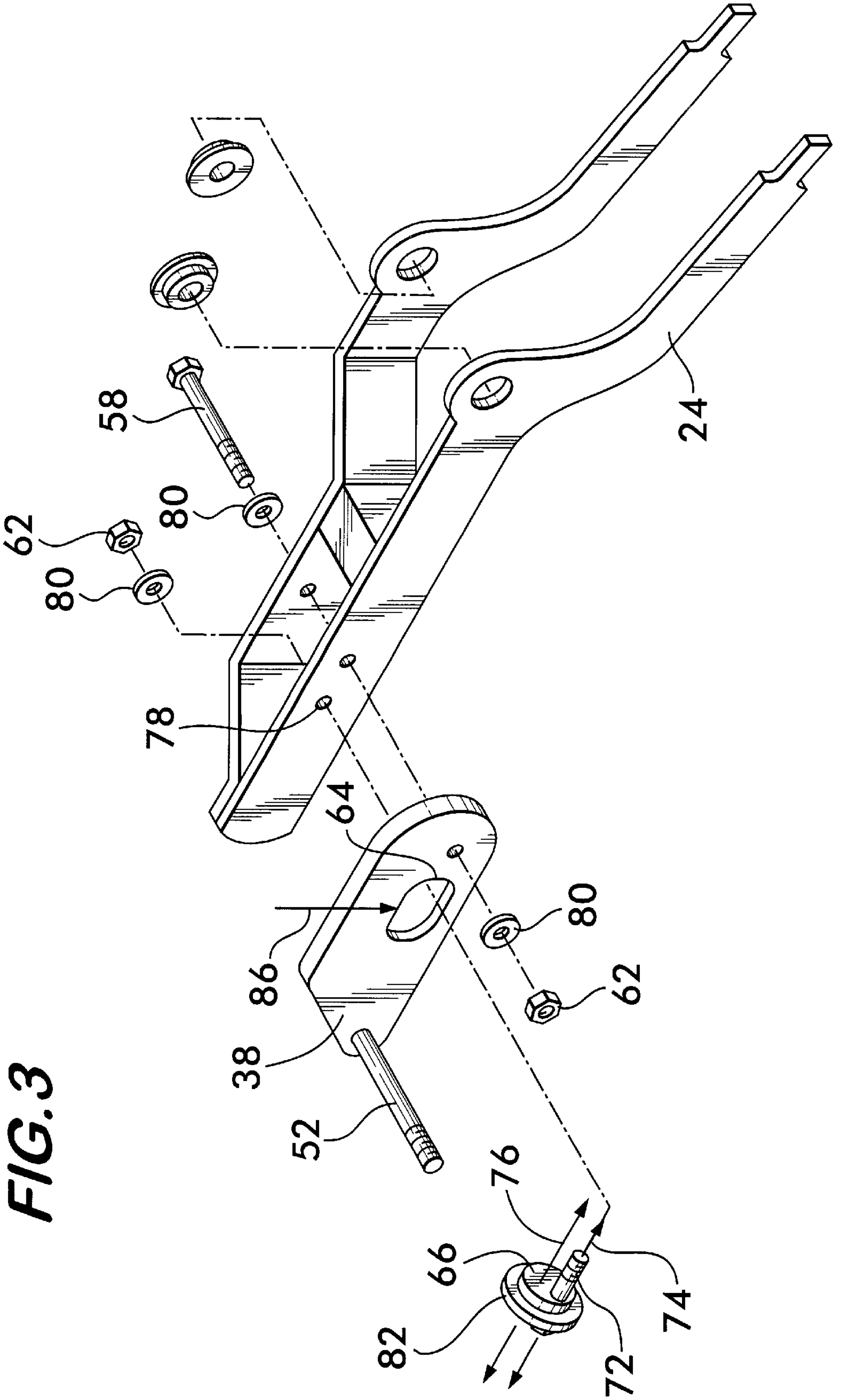
FIG. 3 is an illustrated parts breakdown of an anti-tip assembly of the present invention.

As shown in FIG. 3, the adjuster plate 38 has a slot 64 located between the adjuster plate pivot 56 and the wheel stud 52. The locking means 42 includes a cylindrical cam lobe 66. As shown in FIG. 4, the thickness 70 of the cam lobe 66 is slightly less than the thickness 68 of the adjuster plate 38. Referring again to FIG. 3, a cam pin 72 extends from one side of the cam lobe 66. The cam pin is 72 mounted to the cam lobe 66 such that the long axis 74 of the cam pin is displaced from the center axis 76 of the cam lobe 66. When the cam lobe 66 is rotated about its center 76, the cam pin 72 rotates eccentrically about the cam lobe center 76. As assembled, the cam lobe 66 is within the slot 64 in the adjuster plate 38 and the cam pin 72 extends from the cam lobe 66 though a cam aperture 78 in the strut 24. The end of the cam pin 72 is threaded and retained in the aperture by a washer 80 and nut 62.

A retaining plate 82 is attached to the cam lobe 66 on the side opposite from the cam pin 72. The retaining plate 82 is preferably circular in shape, and has an outer diameter 84 (see in FIG. 4) greater than the width 86 of the slot 64 in the adjuster plate 38.

The nut 62 retaining the cam pin 72 within the cam aperture 78 can be loosened to allow the cam pin 72 to rotate, or tightened to bring the retaining plate 82 into abutting contact with the adjuster plate 38. When the retaining plate 82 is in abutting contact with the adjuster plate 38, friction between the retaining plate 82 and the adjuster plate 38 prevents the cam lobe 66 from rotating relative to the adjuster plate 38, and thus locks the position of the adjuster plate 38 relative to the strut 24.

As seen in FIG. 4, the diameter 88 of the cam lobe is substantially the same as the width 86 of the slot 64 in the adjuster plate 38. When the nut 62 retaining the cam pin 72 is loosened to allow rotation, the cam lobe 66 is free to spin about the long axis 74 of cam pin 72 within the slot 64. The displacement of the long axis 74 of cam pin 72 from the center axis 76 of the cam lobe 66 allows the cam lobe to move forward and back in the slot 64 along line 92. Because the cam pin 72 is rotatably fixed to the strut 24, the movement of the cam lobe 66 along line 92 in the slot 64 results in a change in the angle between the adjuster plate 38 and the strut 24.

The inclusion of the locking means 42 between the adjuster plate 38 and the strut 24 provides a lock which withstands large forces before the relative positioning of the adjuster plate 38 to the strut 24 will slip. The angle between the adjuster plate 38 and the strut 24 cannot change unless the cam lobe 66 is rotated within the slot 64. By utilizing a retaining plate 82, the friction between the locking means 42 and the adjuster plate 38 is at a location where the moment arm of the friction which resists any twisting of the cam lobe 66 is larger than the moment arm of any force tending to rotate the cam lobe 66. As such, there is a mechanical advantage present, which ensures that the adjuster plate 38 cannot pivot relative to the strut 24 when the cam pin 72 is tightened. The locking means 42 can work without the retaining plate 82 based on friction between the cam lobe 66 and the strut 24. However, the common outer diameter between the resulting friction location and the cam lobe 66 does not benefit from a mechanical advantage.

The locking means 42 comprising the cam lobe 66, retaining plate 82, and cam pin 72 is preferably made by forming the cam lobe 66 and retaining plate 82 from a single piece of weldable material. A lobe aperture 94 is drilled through the combined cam lobe 66 and retaining plate 82, and a cam pin 72 is passed through this aperture 94. The cam pin 72 is then welded to the combined cam lobe 66 and retaining plate 82. This provides a hexagonal head 96 which extends from the retaining plate 82, allowing a user to apply a wrench (not shown) to the hexagonal head 96 and, when the cam pin 72 and adjuster plate pivot 56 are loose, to adjust the position of the adjuster plate 38 by turning the hexagonal head 96.

Although the embodiment disclosed above places the slot 64 in the adjuster plate 38, and between the wheel stud 52 and the pivotable connection 40, this location is not essential. The slot 64 can be located in the strut 24, and/or opposite from the wheel stud 52 relative to the pivotable connection 40.

The present invention may be embodied in other specific forms without departing from the spirit or essential attributes thereof, and accordingly, reference should be made to the appended claims, rather than to the foregoing specification, as indicating the scope of the invention.

I claim:

1. An adjustable anti-tip assembly, comprising:

a strut;

an adjuster plate having a slot;

an anti-tip wheel, the anti-tip wheel being rotatably connected to the adjuster plate;

a pivotable connection between the adjuster plate and the strut; and an adjustment cam, the adjustment cam having a cylindrical lobe and a rotatable connection to the strut, the cylindrical lobe having a diameter and a central axis and being positioned within the slot of the adjuster plate and free to rotate about the rotatable connection and slide within the slot, the rotatable connection between the strut and the cylindrical lobe being displaced from the central axis of the cylindrical lobe, wherein rotation of the cylindrical lobe within the slot causes the adjuster plate to pivot relative to the strut.

2. An adjustable anti-tip assembly according to claim 1, further comprising locking means between the adjuster plate and the strut, the locking means comprising a threaded fastener extending through the strut along the axis of rotation of the pivotable connection, the threaded fastener retaining the adjuster plate to the assembly by a threaded retainer, wherein tightening the threaded retainer on the threaded fastener compresses the adjuster plate against the strut.

3. An adjustable anti-tip assembly, comprising:

a strut;

an adjuster plate;

an anti-tip wheel, the anti-tip wheel being rotatably connected to the adjuster plate;

a pivotable connection between the adjuster plate and the strut; and a locking means between the adjuster plate and the strut comprising a threaded fastener extending through the adjuster plate along the axis of rotation of the pivotable connection, the threaded fastener retaining the adjuster plate to the assembly by a threaded retainer, wherein tightening the threaded retainer on the threaded fastener compresses the adjuster plate against the strut, the locking means selectively preventing the adjuster plate from pivoting relative to the strut, and alternately being releasable to allow adjustment of the adjuster plate relative to the strut continuously through a range over which the adjuster plate is pivotable.

4. An adjustable anti-tip assembly according to claim 3, wherein the adjuster plate includes an elongated slot, the elongated slot formed radially from the axis of rotation of the pivotable connection between the adjuster plate and the strut, wherein the locking means further comprises a second threaded fastener and a second retainer, the second threaded fastener extending through an aperture in the strut and the elongated slot.

5. An adjustable anti-tip assembly according to claim 3, wherein the strut includes an elongated slot, the elongated slot formed radially from the axis of rotation of the pivotable connection between the adjuster plate and the strut wherein the locking means further comprises a second threaded fastener and a second retainer, the second threaded fastener extending through the elongated slot and retaining the adjuster plate to the strut.

6. An adjustable anti-tip assembly according to claim 3, wherein the adjuster plate further comprises a slot, the slot having a width, the adjuster plate and the strut further including apertures there through along the axis of rotation of the pivotable connection; and the anti-tip assembly further comprising an adjustment cam, the adjustment cam having a cylindrical lobe and a rotatable connection to the strut, the cylindrical lobe having a diameter and a rotatable connection and being positioned within the slot of the adjuster plate and free to rotate about the rotatable connection and slide within the slot, the rotatable connection between the strut and the cylindrical lobe being displaced from the central axis of the cylindrical lobe, wherein rotation of the cylindrical lobe within the slot causes the adjuster plate to pivot relative to the strut.

7. An adjustable anti-tip assembly according to claim 6, wherein the diameter of the adjustment cam is substantially equal to the width of the slot.

8. An adjustable anti-tip assembly according to claim 6, further comprising a head on the adjustment cam, said head being shaped to facilitate turning the adjustment cam.

9. An adjustable anti-tip assembly according to claim 8, wherein the head is hexagonally shaped.

10. An adjustable anti-tip assembly according to claim 3, wherein the strut further comprises a slot, the slot having a width, the adjuster plate and the strut further including apertures there through along the axis of rotation of the pivotable connection; and the anti-tip assembly further comprising an adjustment cam, the adjustment cam having a cylindrical cam lobe and a rotatable connection to the adjuster plate, the cylindrical lobe having a diameter and a central axis and being positioned within the slot of the strut and free to rotate about the rotatable connection and slide within the slot, the rotatable connection between the adjuster plate and the cylindrical lobe being displaced from the central axis of the cylindrical a lobe, wherein rotation of the cylindrical lobe within the slot causes the adjuster plate to pivot relative to the strut.

11. An adjustable anti-tip assembly according to claim 10, wherein the diameter of the adjustment cam is substantially equal to the width of the slot.

12. An adjustable anti-tip assembly according to claim 15, further comprising a head on the adjustment cam, said head being shaped to facilitate turning the adjustment cam.

13. An adjustable anti-tip assembly according to claim 17, wherein the head is hexagonally shaped.

14. An adjustable anti-tip assembly, comprising:

a strut;

an adjuster plate comprising a slot, the slot having a width;

an anti-tip wheel, the anti-tip wheel being rotatably connected to the adjuster plate;

a pivotable connection between the adjuster plate and the strut;

a locking means between the adjuster plate and the strut, the locking means selectively preventing the adjuster plate from pivoting relative to the strut, and alternately being releasable to allow adjustment of the adjuster plate relative to the strut continuously through a range over which the adjuster plate is pivotable; and an adjustment cam, the adjustment cam having a cylindrical lobe and a rotatable connection to the strut, the cylindrical lobe having a diameter and a central axis and being positioned within the slot of the adjuster plate and free to rotate about the rotatable connection and slide within the slot, the rotatable connection between the strut and the cylindrical lobe being displaced from the central axis of the cylindrical lobe, wherein rotation of the cylindrical lobe within the slot causes the adjuster plate to pivot relative to the strut.

15. An adjustable anti-tip assembly according to claim 14, wherein the diameter of the adjustment cam is substantially equal to the width of the slot.

16. An adjustable anti-tip assembly according to claim 14, wherein the rotatable connection comprises a pin extending from the cam lobe through the strut, the assembly further comprising a retaining plate, said retaining plate affixed to the adjustment cam and having a diameter greater than the width of the slot, said retaining plate abutting the adjuster plate when a threaded retainer retaining the pin to the strut is tightened.

17. An adjustable anti-tip assembly according to claim 16, further comprising a head on the retaining plate, said head being shaped to facilitate turning the adjustment cam.

18. An adjustable anti-tip assembly according to claim 17, wherein the head is hexagonally shaped.

19. An adjustable anti-tip assembly, comprising:

a strut having a slot, the slot having a width;

an adjuster plate;

an anti-tip wheel, the anti-tip wheel being rotatably connected to the adjuster plate;

a pivotable connection between the adjuster plate and the strut; and a locking means between the adjuster plate and the strut, the locking means comprising an adjustment cam, the adjustment cam having a cylindrical cam lobe and a rotatable connection to the adjuster plate, the cylindrical cam lobe having a diameter and a central axis and being positioned within the slot of the strut and free to rotate about the rotatable connection and slide within the slot, the rotatable connection between the adjuster plate and the cam lobe being displaced from the central axis of the cam lobe, wherein rotation of the cam lobe within the slot causes the adjuster plate to pivot relative to the strut, the locking means selectively preventing the adjuster plate from pivoting relative to the strut, and alternately being releasable to allow adjustment of the adjuster plate relative to the strut continuously through a range over which the adjuster plate is pivotable.

20. An adjustable anti-tip assembly according to claim 19, wherein the diameter of the adjustment cam is substantially equal to the width of the slot.

21. An adjustable anti-tip assembly according to claim 19, wherein the rotatable connection comprises a pin extending from the cam lobe through the adjuster plate, the assembly further comprising a retaining plate, said retaining plate affixed to the adjustment cam and having a diameter greater than the width of the slot, said retaining plate abutting the strut when a threaded retainer retaining the pin to the adjuster plate is tightened.

22. An adjustable anti-tip assembly according to claim 21, further comprising a head on the retaining plate, said head being shaped to facilitate turning the adjustment cam.

23. An adjustable anti-tip assembly according to claim 22, wherein the head is hexagonally shaped.

24. A wheelchair comprising:

a frame;

a seat supported on the frame, the seat having a cushion portion and a back portion for respectively supporting a person's thighs and buttocks and a person's back when the person is in a seated upright position;

a pair of wheels positioned on opposite sides of the frame and rotatable about transverse axes positioned below the cushion of the seat;

at least one idler wheel connected to the frame, the idler wheel mounted for rotation about a horizontal axis and supported for rotational movement about a vertical axis;

at least one anti-tip assembly positioned opposite the at least one idler wheel from the axis of rotation of the pair of wheels, the anti-tip assembly including a strut, an adjuster plate having a slot, an anti-tip wheel, the anti-tip wheel being rotatably connected to the adjuster plate, the adjuster plate being pivotably connected to the strut, and an adjustment cam, the adjustment cam having a cylindrical lobe and a rotatable connection to the strut, the cylindrical lobe having a diameter and a central axis and being positioned within the slot of the adjuster plate and free to rotate about the rotatable connection and slide within the slot, the rotatable connection between the strut and the cylindrical lobe being displaced from the central axis of the cylindrical lobe, wherein rotation of the cylindrical lobe within the slot causes the adjuster plate to pivot relative to the strut.

25. A wheelchair according to claim 24, further comprising a threaded fastener extending through the adjuster plate along the axis of rotation of the pivotable connection, the threaded fastener retaining the adjuster plate to the assembly by a threaded retainer, wherein tightening the threaded retainer on the threaded fastener compresses the adjuster plate against the strut.

26. A wheelchair according to claim 24, further comprising a threaded fastener extending through the strut along the axis of rotation of the pivotable connection, the threaded fastener retaining the adjuster plate to the assembly by a threaded retainer, wherein tightening the threaded retainer on the threaded fastener compresses the adjuster plate against the strut.

27. A wheelchair according to claim 24, wherein the rotatable connection comprises a threaded fastener and a retainer, the threaded fastener extending from the slot through the strut.

28. A wheelchair according to claim 24, further comprising locking means including a threaded fastener and a retainer, the threaded fastener extending from the slot through the strut and retaining the adjuster plate to the strut.

29. A wheelchair according to claim 24, wherein the adjustment cam further comprises a stud extending along the rotation axis of the rotatable connection and through the strut, and a threaded retainer retaining the adjustment cam to the strut.

30. A wheelchair comprising:

a frame;

a seat supported on the frame, the seat having a cushion portion and a back portion for respectively supporting a person's thighs and buttocks and a person's back when the person is in a seated upright position;

a pair of wheels positioned on opposite sides of the frame and rotatable about transverse axes positioned below the cushion of the seat, at least one idler wheel connected to the frame, the idler wheel mounted for rotation about a horizontal axis and supported for rotational movement about a vertical axis;

at least one anti-tip assembly positioned opposite the at least one idler wheel from the axis of rotation of the pair of wheels, the anti-tip assembly including a strut having a slot;

an adjuster plate pivotably connected to the strut, an anti-tip wheel rotatably connected to the adjuster plate, and an adjustment cam, the adjustment cam having a cylindrical lobe and a rotatable connection to the adjuster plate, the cylindrical lobe having a diameter and a central axis and being positioned within the slot of the strut and free to rotate about the rotatable connection and slide within the slot, the rotatable connection between the strut and the cylindrical lobe being displaced from the central axis of the cylindrical lobe, wherein rotation of the cylindrical lobe within the slot causes the adjuster plate to pivot relative to the strut.

31. An adjustable anti-tip wheel assembly for mounting on a vehicle, the assembly comprising:

a strut having an end adapted to be connected to the vehicle;

an adjuster plate pivotably connected to the strut at a pivot point;

a slot formed in one of the strut or the adjuster plate remote from the pivot point;

an anti-tip wheel mounted on the adjuster plate; and an adjustment mechanism connecting the strut and the adjuster plate remote from the pivot point, the adjustment mechanism comprising a cam positioned in the slot such that the cam can slide along the length of the slot while rotating about a center point, and a post extending from the cam remote from the center point in a direction transverse from its direction of rotation, the post linking the strut and adjuster plate such that rotation of the cam forces the adjuster plate to pivot relative to the strut.

32. A vehicle of the type having a seat mounted above a frame and a pair of independently mounted drive wheels for propelling and steering the vehicle, the vehicle comprising:

an anti-tip wheel mounted to the frame on an adjustable support, the adjustable support comprising a strut pivotably connected to an adjuster plate at a pivot point;

a slot formed in one of the strut or the adjuster plate remote from the pivot point;

a cam positioned in the slot, the cam being slideable along the length of the slot and rotatable about a center of rotation, the cam having a connector pin remote from its center of rotation, the connector pin connecting the strut and the adjuster plate such that rotation of the cam causes the adjuster plate to pivot relative to the strut cam.

* * * * *